(12) United States Patent
Chung

(10) Patent No.: US 11,026,177 B1
(45) Date of Patent: Jun. 1, 2021

(54) REDUCING BATTERY CONSUMPTION FOR PORTABLE DEVICES WITH MICROPHONES

(71) Applicant: Amazon Technologies, Inc., Seattle, WA (US)

(72) Inventor: Tan Shen Cliff Chung, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/750,906

(22) Filed: Jan. 23, 2020

(51) Int. Cl.
| | |
|---|---|
| *H04W 52/02* | (2009.01) |
| *G10L 15/22* | (2006.01) |
| *G10L 15/18* | (2013.01) |
| *H04R 29/00* | (2006.01) |
| *H04R 1/08* | (2006.01) |
| *G10L 15/30* | (2013.01) |
| *H04W 4/80* | (2018.01) |
| *H04M 1/72412* | (2021.01) |

(52) U.S. Cl.
CPC ..... *H04W 52/0277* (2013.01); *G10L 15/1815* (2013.01); *G10L 15/22* (2013.01); *G10L 15/30* (2013.01); *H04R 1/08* (2013.01); *H04R 29/004* (2013.01); *G10L 2015/223* (2013.01); *H04M 1/72412* (2021.01); *H04W 4/80* (2018.02)

(58) Field of Classification Search
CPC ........... H04W 52/0277; H04W 4/80; G10L 15/1815; G10L 15/22; G10L 15/30; G10L 2015/233; H04R 1/08; H04R 29/004; H04M 1/7253
See application file for complete search history.

(56) References Cited

U.S. PATENT DOCUMENTS

| | | | |
|---|---|---|---|
| 2014/0258357 A1* | 9/2014 | Singh | G06F 9/4856 709/201 |
| 2018/0061418 A1* | 3/2018 | Patil | G06F 3/0482 |
| 2020/0196372 A1* | 6/2020 | Ouyang | H04W 4/80 |

* cited by examiner

*Primary Examiner* — Yuwen Pan
*Assistant Examiner* — Angelica M Perez
(74) *Attorney, Agent, or Firm* — Eversheds Sutherland (US) LLP

(57) ABSTRACT

Systems, methods, and computer-readable media are disclosed for systems and methods for reducing battery consumption for portable devices with microphones. Example methods may include receiving, by a user device, a first indication from a first device indicating that voice data is forthcoming, where the first device comprises a first battery and a first microphone. Example methods may include determining that a first battery level of the first battery is less than a threshold, and determining that a second device is in an active state, where the second device comprises a second battery and a second microphone. Methods may include sending the second device a second indication to activate the second microphone, receiving the voice data from the second device, and causing presentation of a digital response to a request associated with the voice data at the first device.

18 Claims, 7 Drawing Sheets

REDUCING BATTERY CONSUMPTION FOR PORTABLE DEVICES WITH MICROPHONES

BACKGROUND

Electronic devices, such as smartphones, tablets, and the like, may be used for various purposes, such as making calls, accessing information, sending messages, consuming content, and so forth. Different devices may have different form factors, shapes, footprints, and so forth, and may therefore have batteries of different sizes and/or capacities. Depending on functionality of certain devices, different functions may consume different amounts of battery. In addition, depending on the purpose of a device, an expected use time for the device on a single battery charge may vary. Accordingly, reducing battery consumption for portable devices with microphones or other sensors may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
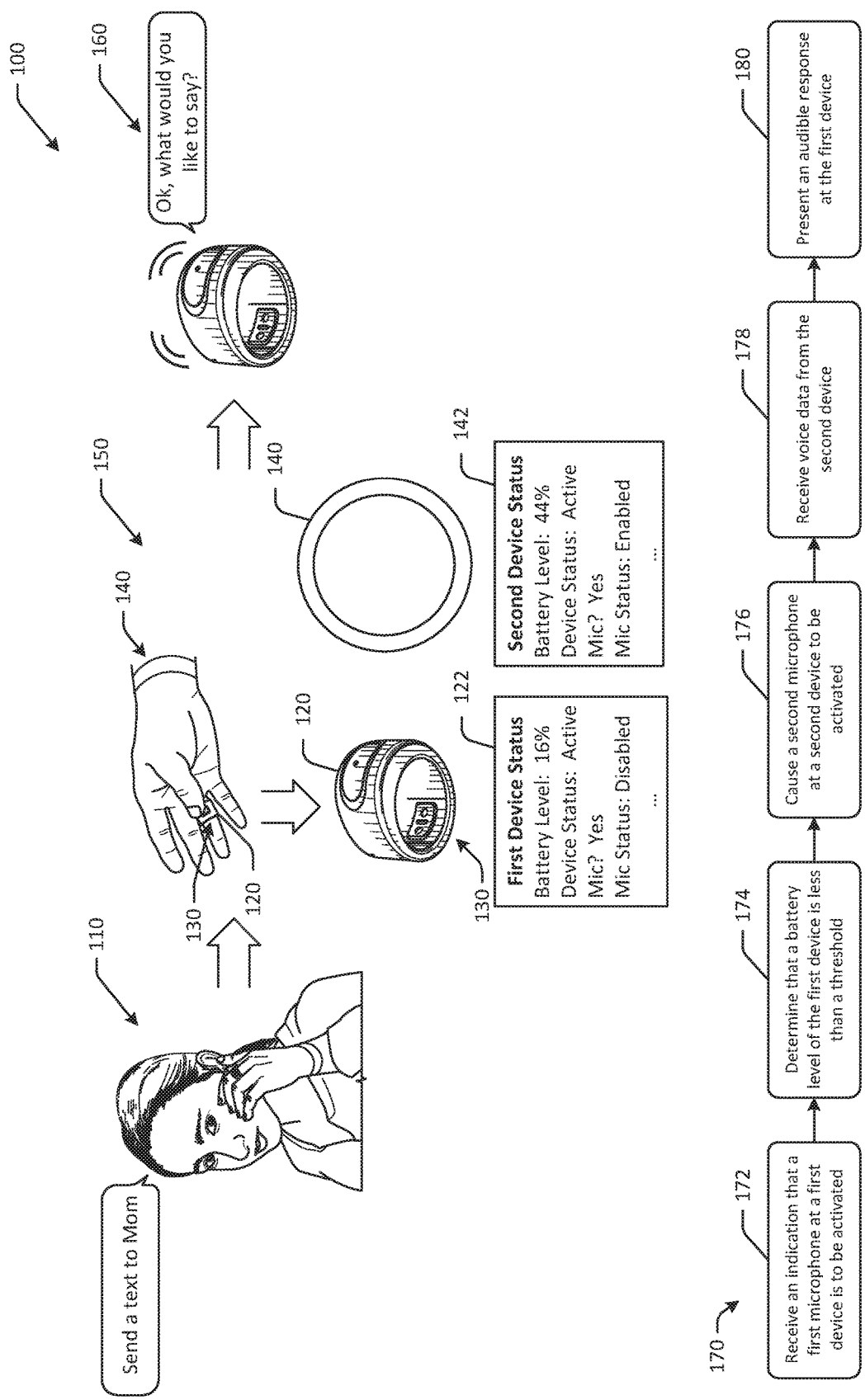
FIG. 1 is a schematic illustration of an example use case for reducing battery consumption for portable devices with microphones and/or other sensors in accordance with one or more example embodiments of the disclosure.

Wearable devices may include electronic devices that a user can wear, for example, as an accessory, or can otherwise take with them, such as in the user's pocket. Wearable devices may include watches, bracelets, glasses, electronic trackers, and so forth. Because wearable devices may be worn by users, factors of the device including size, weight, shape, and the like may affect a user experience with the device. For example, a device that is bulky, heavy, or too large may be impractical for certain users to use or wear. In addition, reducing a size or footprint of a device may affect the functionality of the device. For example, reducing the size of a battery in the device may reduce an amount of time the device can operate without being recharged. Accordingly, a size, shape, weight, and/or other factors may impact not only a user experience with a wearable device, but functionality of the device as well.

For wearable devices, or other types of portable devices, space for batteries may be limited, resulting in reduced battery capacity for some devices. For example, a ring-shaped electronic device designed to be worn around a user's finger may have a relatively smaller battery than a device worn around a user's wrist, such as a wristband or watch. Such devices may have the same functionality as other devices. For example, both a ring-shaped electronic device and a smartwatch may have microphones and/or accelerometers to detect user inputs such as voice or speech input, gestures, and so forth. The amount of battery consumed during usage of such sensors may be different for different devices. Moreover, the specific battery in a device may impact a number of times certain functions can be performed. For example, devices having batteries with relatively greater capacity may be able to use a microphone sensor for a greater length of time than devices having batteries with relatively less capacity. As a result, certain devices may run out of battery or otherwise consume an entire battery charge faster than others.

In some instances, a user may be wearing more than one wearable device or may otherwise have more than one portable electronic device on or near their person. In such instances, some devices may have the same functionality. For example, both a ring-shaped electronic device and a smart wristband may have heartrate detection functionality, microphone functionality, and so forth. As a result, use of a sensor at a device with favorable battery status and/or greater capacity may result in reduced battery consumption for devices with smaller batteries, less capacity, etc.

Embodiments of the disclosure include systems and methods of reducing battery consumption for portable devices with sensors such as microphones. For example, certain embodiments may automatically determine whether a battery level of a certain device is below a threshold, and, if so, may determine whether another device with the same functionality is active and whether the sensor can be used instead of the original device. Some embodiments may use a number of metrics and/or battery status indicators to determine whether sensor handover is to occur, and, if so, to which device handover should be initiated.

This disclosure relates to, among other things, devices, systems, methods, computer-readable media, techniques, and methodologies for reducing battery consumption for portable devices with microphones and presentation. Certain embodiments may automatically cause a device to activate a sensor, to enter a low power mode, to present information, and/or other functionality.

Referring to FIG. 1, an example use case 100 for reducing battery consumption for portable devices with microphones and/or other sensors is depicted in accordance with one or more example embodiments of the disclosure. In the illustrated example, at a first instance 110 a user may use a ring-shaped electronic device 120 to communicate with another electronic device, such as a smartphone. In other examples, the ring-shaped electronic device 120 may be used to communicate with other electronic devices, such as streaming devices, television devices, home automation devices (e.g., thermostat devices, appliances, etc.), and/or other devices. The ring-shaped electronic device 120 may include one or more buttons 130. The button 130 may be on a lower portion of the ring-shaped electronic device 120, such that a user can push the button 130 with a thumb of the hand that the user is wearing the ring-shaped electronic device 120 on. The user may press or otherwise interact with the button 130 to initiate a voice data stream to the smartphone, or to otherwise indicate that the user intends to speak an utterance or provide speech input at the ring-shaped electronic device 120.

The ring-shaped electronic device 120 may be wirelessly connected to the smartphone over a wireless connection, such as a Bluetooth connection, a WiFi connection, or another suitable wireless connection. To interact with the ring-shaped electronic device 120, the user that is wearing the ring-shaped electronic device 120 may, in some instances, interact with the button 130 or other component of the ring-shaped electronic device 120. Different user interactions with the ring-shaped electronic device 120 may result in different functions being triggered at the ring-shaped electronic device 120. The ring-shaped electronic device 120 may include one or more microphones that may be used to detect voice input and/or generate a signal representing audio input. For example, in FIG. 1, the ring-shaped electronic device 120 may include a first microphone positioned at or near a bottom of the ring-shaped electronic device 120, where the bottom of the ring-shaped electronic device 120 may face the user's palm when the user makes a first ("bottom," "top," "upper," "lower," and "side" as used herein describe relative positioning for illustrative examples and not absolute positioning). Accordingly, to speak into the first microphone, the user may raise the user's hand towards the user's mouth and may speak into or near the first microphone.

The user may also be wearing a wristband 140 that may be an electronic device. The wristband 140 may be used to track fitness, track pulse or heartrate, capture speech input, present time or other information, and so forth. The wristband 140 may include one or more microphones that may be used to detect voice input and/or generate a signal representing audio input.

At a second instance 150, the user device to which the ring-shaped electronic device 120 and the wristband 140 are wirelessly coupled may receive an indication from the ring-shaped electronic device 120 that the user interacted with the button 130, indicating that voice data is forthcoming and/or that a voice data stream is to be initiated. The user device may determine first device status data 122 for the ring-shaped electronic device 120. The first device status data 122 may indicate that the battery level for the first device, or the ring-shaped electronic device 120, is 16%, that the device is in an active state, that the device has a microphone, and that the microphone is currently disabled. Based at least in part on the battery level of the ring-shaped electronic device 120, the user device may determine that handover of the microphone usage should occur. For example, the user device may determine that the battery level of the ring-shaped electronic device 120 is less than a threshold value, such as a handover threshold (which may be specific to the ring-shaped electronic device 120). The handover threshold may be used by the user device to determine whether to activate the first microphone, or the microphone at the ring-shaped electronic device 120. The user device may therefore determine whether any other connected devices has a microphone that can be used instead of the microphone at the ring-shaped electronic device 120.

For example, the user device may determine second device status data 142 for the wristband 140. The second device status data 142 may indicate that the battery level for the second device, or the wristband 140, is 44%, that the device is in an active state, that the device has a microphone, and that the microphone is currently disabled. Based at least in part on the battery level of the wristband 140, the user device may determine that handover of the microphone usage should be to the second device instead of the first device. For example, the user device may determine that the battery level of the wristband 140 is greater than the handover threshold (which may be specific to the wristband 140 or its battery capacity). The user device may therefore determine that the second device has a microphone that can be used instead of the microphone at the ring-shaped electronic device 120.

Accordingly, the user device may send the wristband 140 instructions to activate its microphone, and may cause the ring-shaped electronic device 120 to enter a low power mode and/or otherwise deactivate its microphone. The user device may receive voice data from the wristband 140, and may determine a response. In some instances, the user device may send the wristband 140 or other device instructions to deactivate its microphone after the voice data is received. The user device may send the response data to the first device, or the ring-shaped electronic device 120, for presentation. For example, in FIG. 1, the user may speak an utterance of "send a text to mom," which may be detected by the microphone of the wristband 140 (instead of the microphone at the ring-shaped electronic device 120), and an audible response of "ok, what would you like to say?" may be presented at the ring-shaped electronic device 120 at a third instance 160. Accordingly, battery consumption associated with use of the microphone may be avoided at the ring-shaped electronic device 120, thereby extending its battery life.

To reduce battery consumption for portable devices with microphones and/or other sensors, an example process flow 170 is presented and may be performed, for example, by one or more modules at a user device, such as a smartphone. The user device may include at least one memory that stores computer-executable instructions and at least one processor configured to access the at least one memory and execute the computer-executable instructions to perform various actions or operations, such as one or more of the operations in the process flow 170 of FIG. 1.

At a first block 172, the user device may receive an indication that a first microphone at a first device is to be activated, which may indicate that a voice data stream is forthcoming. The user device may receive the indication from, for example, the ring-shaped electronic device 120 when the user presses the button 130.

At a second block 174, the user device may determine that a battery level of the first device is less than a threshold, such as the handover threshold. For example, in FIG. 1, the handover threshold may be 20%, and since the first device status data 122 indicates the battery of the ring-shaped electronic device 120 is at 16%, the user device may determine that a battery level of the first device is less than a threshold. The handover threshold may be different for different devices in that it may be relatively lower for batteries or corresponding devices with relatively large capacities.

At a third block 176, the user device may cause a second microphone at a second device to be activated. For example, the user device may select the wristband 140 as the device at which to activate its microphone, and may send a signal or command to the wristband 140 to activate its microphone.

At a fourth block 178, the user device may receive voice data from the second device. For example, the wristband 140 may capture the user utterance using its microphone and may send corresponding voice data to the user device.

At a fifth block 180, the user device may cause the first device to present an audible response. For example, responsive to the user utterance, the user device may determine a response and cause the first device, such as the ring-shaped electronic device 120 to present the response using its speakers, as illustrated at the third instance 160.

Accordingly, if multiple accessories use the same sensor, embodiments of the disclosure reduce battery consumption of at least one of the devices by ensuring the data is collected once (e.g., if two accessories have heart rate sensors, data from one device can be used instead of two. In addition, if a device has not been charged for a long time, its battery life can be extended by handing off tasks to another device.

Although discussed in the context of microphones, embodiments of the disclosure may be applicable to other sensors, such as accelerometers, heartrate sensors, etc. For example, a user device may determine that a first heart rate sensor at a first wearable device (e.g., the ring-shaped electronic device 120, etc.) is in an active state, and may determine that a second wearable device (e.g., the wristband 140, etc.) includes a second heart rate sensor in an active state. The user device may therefore send the first wearable device a signal that causes the first wearable device to deactivate the first heart rate sensor, and may instead receive heart rate data from the second wearable device.

Example embodiments of the disclosure provide a number of technical features or technical effects. For example, in accordance with example embodiments of the disclosure, certain embodiments of the disclosure may automatically activate sensors at connected devices, cause certain devices to enter low power modes, awake modes, sleep modes, etc. As a result of improved functionality, battery life for devices may be improved and battery consumption may be reduced. Embodiments of the disclosure may improve computing efficiency and bandwidth by reducing a number of actions and calculations that need to be performed manually. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
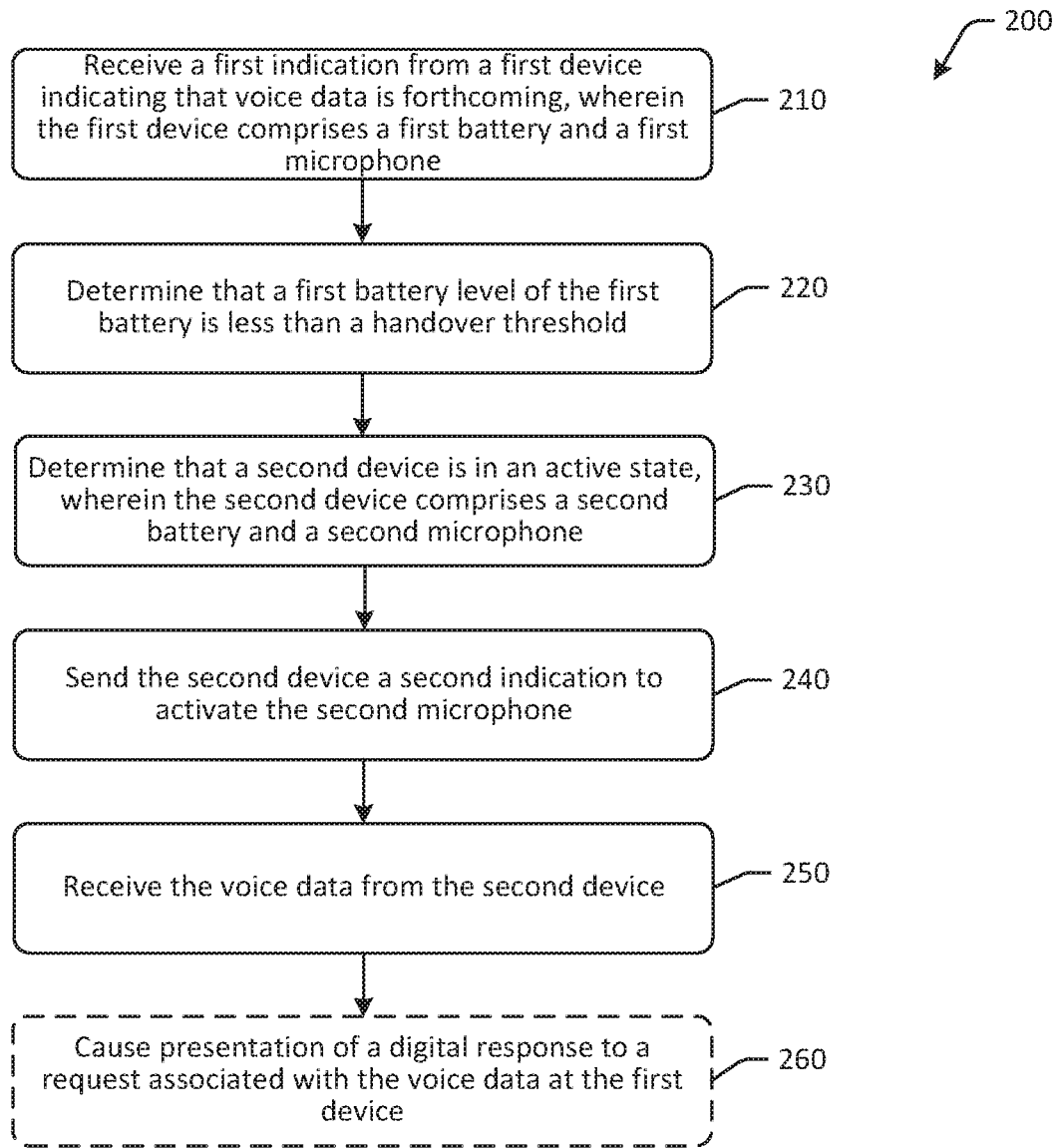
FIG. 2 is a schematic illustration of an example process flow for reducing battery consumption for portable devices with microphones and/or other sensors in accordance with one or more example embodiments of the disclosure.

FIG. 2 depicts an example process flow 200 for reducing battery consumption for reducing battery consumption for portable devices with microphones and/or other sensors in accordance with one or more example embodiments of the disclosure. While example embodiments of the disclosure may be described in the context of ring-shaped electronic devices, it should be appreciated that the disclosure is more broadly applicable to any type of device with limited battery capacity. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a user device wirelessly coupled to a ring-shaped electronic device, may be executed to receive a first indication from a first device indicating that voice data is forthcoming, where the first device comprises a first battery and a first microphone. For example, one or more interaction detection modules at a user device may receive a first indication from a first device indicating that voice data is forthcoming, where the first device comprises a first battery and a first microphone. The first device may be a ring-shaped electronic device that includes a first battery and a first microphone. Due to its form factor, the first battery may have limited physical size, and may therefore have relatively less capacity than other batteries with larger footprints or profiles. Other embodiments may be different devices, such as wearable devices like earbuds, headphones, wristbands, watches, glasses or frames, and the like. User interactions with the ring-shaped electronic device may include voice interactions, button interactions, gesture interactions, and/or other interactions. User interactions with the button may include one or more taps, presses, press-and-hold, and/or other interactions or combinations thereof. Button user interactions may include more than one individual interaction over time. For example, a user interaction with the button may include two or three button taps in some embodiments. Some embodiments of ring-shaped electronic devices may include one or more buttons, one or more speakers, one or more microphones, one or more motion sensors, and/or other or different components. The user device may receive an indication from the first device that the first device intends to stream or otherwise communicate voice data to the user device. The first device may intend to capture the voice data using the first microphone. Before the voice data is captured and/or the first microphone is activated or otherwise enabled, the first device may send a notification or other signal to the user device prior to initiating the voice data communication, such that the user device is aware of the forthcoming communication. The first device may optionally include a button that is pressed to trigger the first indication.

At block 220 of the process flow 200, computer-executable instructions stored on a memory of a device, such as a user device, may be executed to determine that a first battery level of the first battery is less than a handover threshold. For example, one or more battery tracking modules at a user device may determine that a first battery level of the first battery is less than a handover threshold. The user device may optionally request, or the first device may send battery level data to the user device. For example, the first device may send battery level data to the user device periodically, upon request, and/or when triggered (e.g., when the microphone is activated, when the battery level falls below a certain threshold(s), etc.). The user device may receive the battery level data from the first device. The battery level data may indicate a status of the first battery, such as a remaining charge amount (e.g., a percentage, an absolute value, a number of milliamps, etc.). The user device may determine a most recent battery level of the first battery, and may compare the battery level of the first battery at the first device to a handover threshold. The handover threshold may be used by the user device to determine whether a handover should be considered. Handover may include using the microphone of a device other than the first device to capture the voice data that a user intends to communicate. Other embodiments may use handover for any suitable sensor data, such as heartrate data, accelerometer data, positioning data, and/or other sensor data. The handover threshold may be different for different devices. For example, the handover threshold for the first device may be a certain remaining battery percentage (e.g., 20%, 25%, etc.), or a certain amount of remaining capacity, such as 20 mAh, etc., or another value. In contrast, the handover threshold for a different device with a different battery capacity may be different than that of the first device. The user device may be configured to determine the appropriate handover threshold based at least in part on a device identifier of the first device. The most recent battery level data for the first device may be compared to the handover threshold, and the user device may determine, at least partially based on the handover threshold and the battery level data, whether handover of microphone usage should occur. In the example discussed with respect to FIG. 2, the user device may determine that handover is to occur, and may therefore determine which device and/or microphone is to be activated.

At block 230 of the process flow 200, computer-executable instructions stored on a memory of a device, such as a user device, may be executed to determine that a second device is in an active state, wherein the second device comprises a second battery and a second microphone. For example, one or more device selection modules at a user device may be configured to determine that a second device is in an active state, wherein the second device comprises a second battery and a second microphone. The user device may be wirelessly connected to one or more other devices, such as the first device, a second device, and/or other portable devices and/or battery-powered devices via wireless connections such as Bluetooth, WiFi, ZigBee, Near Field Communication, or another suitable wireless connection protocol. The user device may determine which devices are connected to the user device, as well as which devices are in an active state. Devices may be in an active state when the device is actively connected to the user device, when a most recent communication from the device to the user device was within a time interval (e.g., 5 seconds, 2 minutes, etc.), when the device is powered on or in a non-low power mode, and so forth. The user device may determine functionality associated with respective connected devices in active states. For example, the user device may determine which of the active devices has microphone functionality (or other sensor functionality for other embodiments). Based at least in part on the identification of active devices that have certain functionality, the user device may determine that microphone usage is to be handed over to that specific device. In instances where no active device has desired functionality, such as microphone functionality, the user device may determine whether any connected devices in an inactive state has microphone functionality, and in certain instances, may attempt to activate such devices (e.g., by sending a wakeup command, etc.). In instances where more than one connected device has desired functionality, the user device may select one of the devices to handover microphone or sensor usage to, such as based at least in part on total available battery power, microphone usage battery draw (e.g., the amount of battery consumed as a result of using a microphone at a device, etc.), proximity to a user's mouth, and/or other factors.

In some embodiments, before a handover determination is made, the user device may determine battery level data for the potential handover device. For example, the user device may determine that a second battery level of the second battery of the second device is greater than or equal to the handover threshold. The handover threshold may be the same as the handover threshold for the first device, or may be a different handover threshold specific to the second device. As a result, the second battery may not be accidentally depleted due to the handover.

At block 240 of the process flow 200, computer-executable instructions stored on a memory of a device, such as a ring-shaped electronic device, may be executed to send the second device a second indication to activate the second microphone. For example, one or more communication modules at the user device that is connected to the first device and the second device may be executed to send the second device a second indication to activate the second microphone. For example, the user device may select or otherwise determine the second device for handover of the microphone usage that was originally supposed to be at the first device. The user device may select the second device because it has a greater battery level, greater battery capacity, less battery draw resulting from microphone usage, and/or other factors. The user device may therefore send the second device a command or signal to activate the second microphone at the second device, although the user did not interact with the second device (e.g., the user interacted with the first device, etc.). The second device may receive the command or signal and may activate the second microphone. An elapsed time between the user interaction at the first device and activation of the second microphone at the second device may be less than one second. The second microphone may therefore determine voice data based on audio captured using the second microphone.

In some embodiments, after determining that the first battery level is less than the handover threshold, the user device may send the first device an indication to initiate a low power mode, such that the first device does not activate the first microphone and/or consume any additional battery. The user device may send the indication to initiate the low power mode prior to sending the second device the second indication to activate the second microphone. Accordingly, the first microphone may be disabled after the first indication is received from the first device in some embodiments.

At block 250 of the process flow 200, computer-executable instructions stored on a memory of a device, such as a user device, may be executed to receive the voice data from the second device. For example, one or more communication modules at the user device may be used to receive the voice data from the second device. After interacting with the first user device, the user may speak an utterance. The second microphone at the second device may be used to detect the user utterance and the second device may determine voice data based at least in part on the audio captured using the second microphone. The second device may send the voice data to the user device. The user device may therefore receive the voice data from the second device, although the user interacted with the first device. In some embodiments, the user device may send the second device a fourth indication to deactivate the second microphone after receiving the voice data from the second device. The user device may, in some instances, associate the voice data with a device identifier of the first device, such that any response to the voice data may be presented at the first device. For example, the voice data may include a request for information, and the user device may track that although the voice data was received from the second device, the information is to be presented at the first device because the user initially interacted with the first device.

At optional block 260 of the process flow 200, computer-executable instructions stored on a memory of a device, such as a user device, may be executed to cause presentation of a digital response to a request associated with the voice data at the first device. For example, one or more modules at the user device may be executed to cause presentation of a digital response to a request associated with the voice data at the first device. The user device may determine a response to the voice data, such as by sending the voice data to one or more voice processing servers to determine the request associated with the voice data, and determining the digital response using the request. The user device may send the voice data to one or more voice processing servers to determine a meaning of the voice data, and the voice processing servers may respond with one or more commands and/or directives to the user device (e.g., instructions on actions to perform responsive to the voice data, etc.). The user device may receive the commands and/or directives from the voice processing servers, and may cause presentation of a digital response to a request associated with the voice data at the first device. For example, the digital response may be an audible and/or visual response, such as the presentation of certain information (e.g., weather, traffic, etc.), and may be presented at the first device. In some embodiments, the user device may cause presentation of an audible response to the request associated with the voice data using a speaker of the first device, and/or may cause presentation of a visual response to the request associated with the voice data using a display of the first device. In other embodiments, a different type of digital response, such as vibrational feedback or haptic feedback, may be presented at the first device. For example, the user device may cause presentation of a vibrational response or haptic response to the request associated with the voice data using a vibrational motor of the first device.

Figure 3:
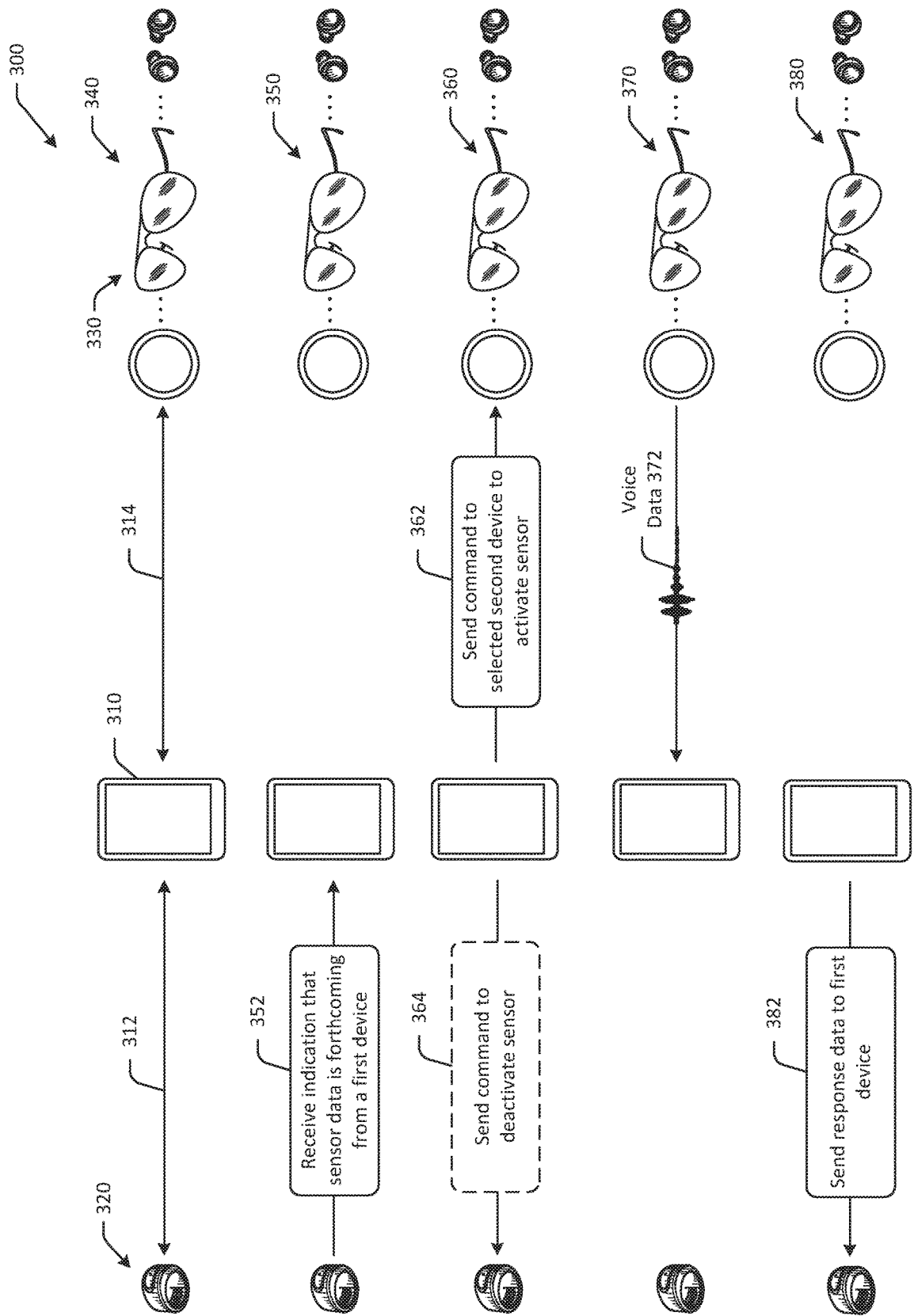
FIG. 3 is a schematic illustration of an example process flow over time in accordance with one or more example embodiments of the disclosure.

FIG. 3 depicts an example process flow 300 over time in accordance with one or more example embodiments of the disclosure. While example embodiments of the disclosure may be described in the context of ring-shaped electronic devices, it should be appreciated that the disclosure is more broadly applicable to any type of wearable device. Some or all of the blocks of the process flows in this disclosure may be performed in a distributed manner across any number of devices. The operations of the process flow 300 may be optional and may be performed in a different order.

In FIG. 3, a user device 310, such as a smartphone, tablet, or other computer system, may be wirelessly coupled to a first device 320 and a second device 330. For example, the first device 320 may be connected to the user device 310 over a first connection 312, and the second device 330 may be connected to the user device 310 over a second connection 314. The first device 320 may be a wearable device, such as a ring-shaped electronic device or other device. The second device 330 may also be a wearable device, such as a wristband, electronic glasses or frames, earbuds or headphones, and/or other wearable or portable devices. The first device 320 may have a first microphone or other sensor of a first type, and the second device 330 may have a second microphone or other sensor of the first type. Additional devices, if any, may also include microphones. Although microphones are used in the example discussed with respect to FIG. 3, any suitable sensor may be used. For example, the devices may include heartrate sensors or accelerometers. Any number of devices may be connected to the user device 310. In some embodiments, the user device 310 may include a microphone as well. However, because the user device 310 may be positioned in a pocket, bag, or otherwise relatively further from a user's mouth than the first device 320 or the second device 330, the user device 310 may attempt to rely on other device microphones other than its own.

At a first instance 340, a user may be wearing the first device 320 and the second device 330. The user may desire to speak a voice command or other speech input at the first device 320. The user may therefore interact with the first device 320 to indicate that a voice command or other speech input is forthcoming. For example, the user may press a button, perform a certain gesture, or otherwise interact with the device.

At a second instance 350, the user device 310 may receive, at operation 352, an indication that sensor data, such as voice data or data captured using a different type of sensor, is forthcoming from the first device 320. The user device 310 may determine most recent battery level data for the first device 320 (which may be included with the indication), and may determine whether the battery level data is greater than or equal to a handover threshold. If so, the user device 310 may not take any action, and the first device 320 may send voice data to the user device 310 using a first microphone of the first device 320. If the user device 310 determines that the battery level data is less than (or equal to) the handover threshold, the user device 310 may determine whether another device with a microphone is available for handover. For example, the user device 310 may determine whether any other devices, such as the second device 330, are in an active state and have microphone functionality. If so, the user device 310 may implement logic to determine whether the device can accept the handover (e.g., using battery level data and/or other data for the potential handover device, etc.), and if there are multiple potential handover devices (e.g., devices that can be used instead of the first device 320, etc.), the user device 310 may select which device to complete handover too. In the example of FIG. 2, the user device 310 may determine that handover should occur to the second device 330. In one example where more than one connected device has the same functionality, the user device 310 may determine that a second battery level of the second battery of the second device 330 is greater than or equal to the handover threshold, and may determine that a third battery level of a third battery of the third device is less than or equal to the handover threshold. The user device 310 may therefore determine that handover to the second device 330 should occur.

At a third instance 360, the user device 310 may optionally send, at operation 364, a command to the first device 320 to deactivate the sensor at the first device 320. In some embodiments, the user device 310 may send a command to the first device 320 that causes the first device 320 to enter a low power mode, such as a sleep mode or hibernate mode. The user device 310 may send, at operation 362, a command to the selected second device 330 to activate its sensor. The second device 330 may receive the command and may activate its sensor. Because the second device 330 may also be a wearable device within audible range of the user's mouth, the second device 330 may be able to detect a user utterance using its microphone.

At a fourth instance 370, the user device 310 may receive voice data 372 from the second device 330. The voice data 372 may be generated by the second device 330 using analog sound data captured by the microphone at the second device 330. An elapsed time between operation 352 and operation 362 may be less than one second.

At a fifth instance 380, the user device 310 may send response data to the first device 320 for presentation at operation 382. The response data may be responsive to the user utterance captured in the voice data 372. The response data may be determined by the user device 310, which may communicate with one or more voice processing servers to determine a meaning of the user utterance and an appropriate response. The response data may be presented at the first device 320 although the voice data was received from the second device 330.

In some embodiments, if no connected device satisfies the handover threshold, the user device 310 may take no action and allow the first device 320 to use its microphone. In other embodiments, the device with the highest remaining amount of battery may be selected, even if the amount is less than the handover threshold.

In some embodiments, the user device 310 may select a device for handover when the device is out of audible range of the user utterance, and therefore the voice data 372 cannot be processed or deciphered. In such instances, the response data may be an error message, and the user may be asked to repeat the user utterance. For the repetition, the user device 310 may allow the first device 310 to capture the user utterance using its microphone, instead of executing a handover. In another example, the user device 310 may determine that the voice data 372 is incomplete, and may cause presentation of an error indicator at the first device 320. The user device 310 may receive an indication from the first device 320 indicating that voice data is forthcoming, and may take no action or may optionally send the first device an indication to activate the first microphone. The user device 310 may therefore receive the voice data from the first device 320.

In one example where more than one connected device has the same functionality, the user device 310 may determine that a second battery level of the second battery of the second device 330 is less than or equal to the handover threshold, and may determine that a third battery level of a third battery of the third device is less than or equal to the handover threshold. The user device 310 may determine that a first battery capacity of the second battery is greater than a second battery capacity of the first battery, and a third battery capacity of the third battery. The user device 310 may therefore determine that handover to the second device 330 should occur.

In one example where more than one connected device has the same functionality, the user device 310 may determine that a second battery level of the second battery of the second device 330 is less than or equal to the handover threshold, and may determine that a third battery level of a third battery of the third device is less than or equal to the handover threshold. The user device 310 may determine that a first battery draw associated with microphone or other sensor (e.g., heart rate sensor, accelerometer, etc.) usage of the second device is less than a second battery draw associated with microphone or other sensor usage of the first device, and a third battery draw associated with microphone or other sensor usage of the third device. The user device 310 may therefore determine that handover to the second device 330 should occur.

Figure 4:
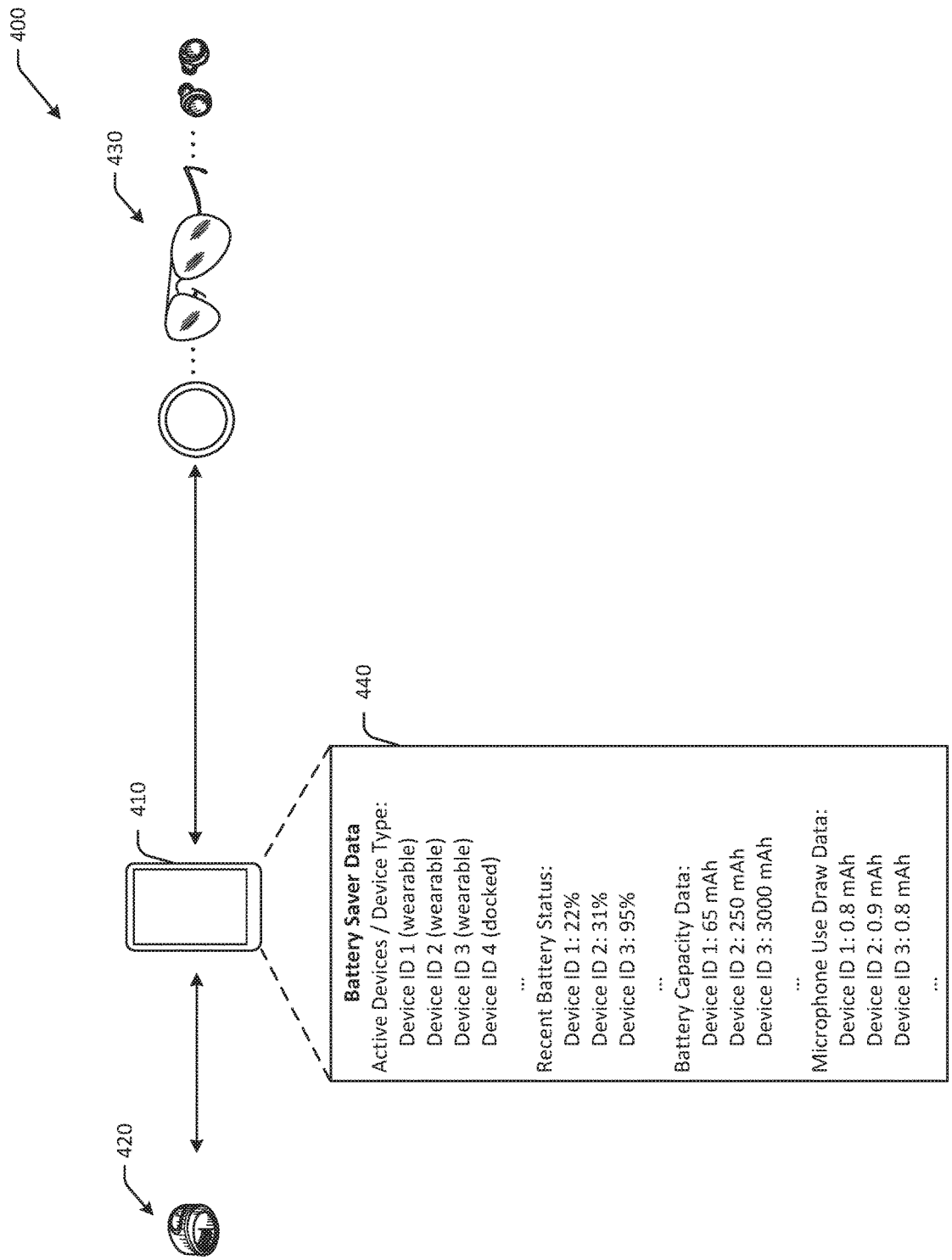
FIG. 4 is a schematic illustration of example battery saver data that may be used to perform one or more determinations in accordance with one or more example embodiments of the disclosure.

FIG. 4 is a schematic illustration of an example use case 400 of example battery saver data that may be used to perform one or more determinations in accordance with one or more example embodiments of the disclosure. Although certain data is illustrated in FIG. 4, in other embodiments, additional data, less data, and/or different data may be used, and data may be stored and/or processed at different datastores and/or computer systems.

In FIG. 4, a user device 410, such as a smartphone, tablet, or other computer system, may be wirelessly coupled to a first device 420 and a second device 430. For example, the first device 420 may be connected to the user device 410 over a first connection, and the second device 430 may be connected to the user device 410 over a second connection. The first device 420 may be a wearable device, such as a ring-shaped electronic device or other device. The second device 430 may also be a wearable device, such as a wristband, electronic glasses or frames, earbuds or headphones, and/or other wearable or portable devices. The first device 420 may have a first microphone, and the second device 430 may have a second microphone. Additional devices, if any, may also include microphones. Although microphones are used in the example discussed with respect to FIG. 4, any suitable sensor may be used. For example, the devices may include heartrate sensors or accelerometers. Any number of devices may be connected to the user device 410. In some embodiments, the user device 410 may include a microphone as well. However, because the user device 410 may be positioned in a pocket, bag, or otherwise relatively further from a user's mouth than the first device 420 or the second device 430, the user device 410 may attempt to rely on other device microphones other than its own.

The user device 410 may receive and aggregate and/or otherwise determine battery saver data 440. The battery saver data 440 may be used by the user device 410 to determine whether a handover should occur at either the first device 420 or the second device 430 (e.g., depending on which device a user interacts with, etc.). The battery saver data 440 may include various information that may be periodically updated between charge events at the first device 420 and/or the second device 430. For example, the battery saver data 440 may include data related to active devices that are connected to the user device 410, along with a device type. For example, device identifiers of active devices may be used to identify which devices are connected and active. The first device 420 may be Device ID 1 and be designated as a wearable device, the second device 430 may be Device ID 2 and be designated as a wearable device, a third device may be Device ID 3 and be designated as a wearable device, a fourth device may be Device ID 4 and designated as a docked device (e.g., not worn at the time, etc.). The user device 410 may use this information to determine a set of candidate devices for handover (e.g., docked or charging devices may be excluded, non-wearable devices may be excluded as they may not be in audible range of the user utterance, etc.).

The battery saver data 440 may include recent battery status information, such as Device ID 1 having a battery status of 22%, Device ID 2 having a battery status of 31%, Device ID 3 having a battery status of 95%, and so forth. The user device 410 may use such data during selection of a device for handover.

The battery saver data 440 may include battery capacity information, which may be indicative of a battery size for a battery at the respective devices. For example, Device ID 1 may have a battery capacity of 65 mAh, Device ID 2 may have a battery capacity of 250 mAh, Device ID 3 may have a battery capacity of 3,000 mAh, and so forth. The user device 410 may use such data during selection of a device for handover. For example, if two devices have similar battery levels, the user device 410 may select the device with the greater capacity.

The battery saver data 440 may include sensor usage draw information, which may be indicative of an amount of battery consumed in association with use of a specific sensor, such as a microphone. The sensor usage draw information may be an actual value, as illustrated in FIG. 4, or may be a rating (e.g., scaled from 1 to 10, etc.), a consumption rate corresponding to a length of time (e.g., 1 mAh per minute of microphone usage, etc.), or another representation of the amount of power used by a particular sensor at the device. For example, Device ID 1 may have a microphone usage draw of 0.8 mAh, Device ID 2 may have a microphone usage draw of 0.9 mAh, Device ID 3 may have a microphone usage draw of 0.8 mAh, and so forth. The user device 410 may use such data during selection of a device for handover. For example, if two devices have similar battery levels, the user device 410 may select the device with the relatively less microphone use draw. For other sensors, the user device 410 may determine that a second device includes a sensor of the same type as a sensor at the first device, and may determine that the second sensor is active. The user device 410 may send the first device an indication to deactivate the first sensor, and may receive sensor data from the second device using the second sensor. The user device 410 may optionally send the sensor data to the first device.

Figure 5:
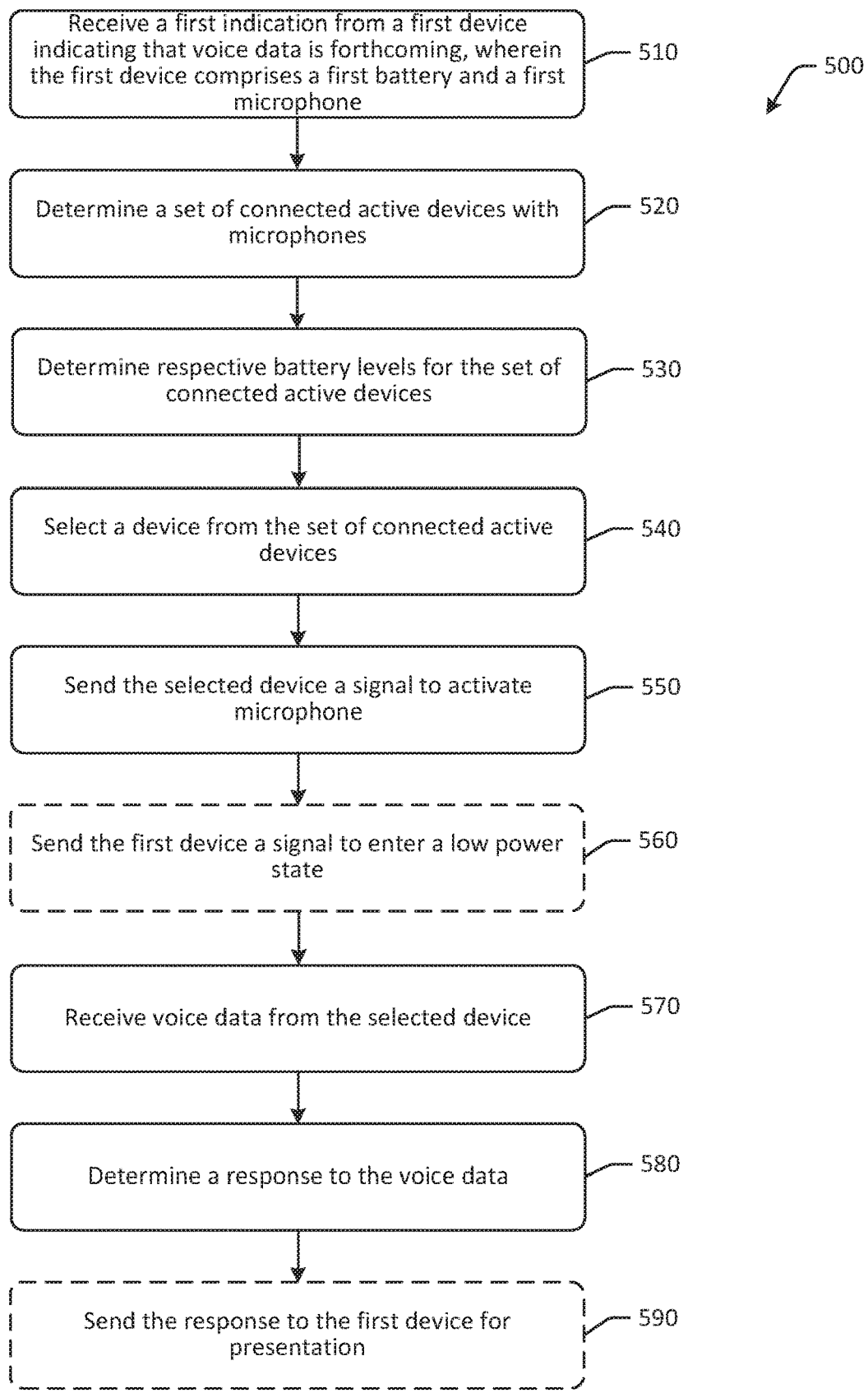
FIG. 5 is a schematic illustration of an example process flow for reducing battery consumption for portable devices with microphones and/or other sensors in accordance with one or more example embodiments of the disclosure.

FIG. 5 is a schematic illustration of an example process flow 500 for reducing battery consumption for portable devices with microphones and/or other sensors in accordance with one or more example embodiments of the disclosure. While example embodiments of the disclosure may be described in the context of ring-shaped electronic devices, it should be appreciated that the disclosure is more broadly applicable to any type of device with limited battery capacity. Some or all of the blocks of the process flows in this disclosure may be performed in a distributed manner across any number of devices. The operations of the process flow 500 may be optional and may be performed in a different order.

At block 510 of the process flow 500, computer-executable instructions stored on a memory of a device, such as a user device wirelessly coupled to a ring-shaped electronic device, may be executed to receive a first indication from a first device indicating that voice data is forthcoming, where the first device comprises a first battery and a first microphone. For example, one or more interaction detection modules at a user device may receive a first indication from a first device indicating that voice data is forthcoming, where the first device comprises a first battery and a first microphone. The first device may be a ring-shaped electronic device that includes a first battery and a first microphone. Due to its form factor, the first battery may have limited physical size, and may therefore have relatively less capacity than other batteries with larger footprints or profiles. Other embodiments may be different devices, such as wearable devices like earbuds, headphones, wristbands, watches, glasses or frames, and the like. User interactions with the ring-shaped electronic device may include voice interactions, button interactions, gesture interactions, and/or other interactions. User interactions with the button may include one or more taps, presses, press-and-hold, and/or other interactions or combinations thereof. Button user interactions may include more than one individual interaction over time. For example, a user interaction with the button may include two or three button taps in some embodiments. Some embodiments of ring-shaped electronic devices may include one or more buttons, one or more speakers, one or more microphones, one or more motion sensors, and/or other or different components. The user device may receive an indication from the first device that the first device intends to stream or otherwise communicate voice data to the user device. The first device may intend to capture the voice data using the first microphone. Before the voice data is captured and/or the first microphone is activated or otherwise enabled, the first device may send a notification or other signal to the user device prior to initiating the voice data communication, such that the user device is aware of the forthcoming communication. The first device may optionally include a button that is pressed to trigger the first indication.

At block 520 of the process flow 500, computer-executable instructions stored on a memory of a device, such as a user device, may be executed to determine a set of connected active devices with microphones. For example, one or more device selection modules at a user device may be executed to determine a set of connected active devices with microphones. The user device may query functionality directly from connected devices, may use a lookup table, may query a database, or otherwise determine functionality associated with connected devices to determine whether the device has a microphone.

At block 530 of the process flow 500, computer-executable instructions stored on a memory of a device, such as a user device, may be executed to determine respective battery levels for the set of connected active devices. For example, one or more battery tracking modules at a user device may be executed to determine respective battery levels for the set of connected active devices. Battery levels may be received periodically from connected devices, and/or may be requested by the user device.

At block 540 of the process flow 500, computer-executable instructions stored on a memory of a device, such as a user device, may be executed to select a device from the set of connected active devices. For example, one or more device selection modules at a user device may be executed to select a device from the set of connected active devices. The user device may select a device based at least in part on a battery level of the device at which sensor use was requested (e.g., a ring-shaped electronic device, another wearable device, etc.), battery saver data such as that illustrated in FIG. 4, and so forth.

At block 550 of the process flow 500, computer-executable instructions stored on a memory of a device, such as a user device, may be executed to send the selected device a signal to activate the microphone or other sensor. For example, one or more device selection modules at a user device may be executed to send the selected device a signal to activate the microphone or other sensor. The signal may be a command or other indication or computer-executable instruction that causes the selected device to activate a certain sensor, such as its microphone.

At optional block 560 of the process flow 500, computer-executable instructions stored on a memory of a device, such as a user device, may be executed to send the first device a signal to enter a low power state. For example, one or more device selection modules at a user device may be executed to send the selected device a signal to activate the microphone or other sensor. The signal may be a command or other indication or computer-executable instruction that causes the selected device to activate a certain sensor, such as its microphone.

At block 570 of the process flow 500, computer-executable instructions stored on a memory of a device, such as a user device, may be executed to receive voice data from the selected device. For example, one or more communication modules at the user device may be used to receive the voice data from the selected device. After interacting with the first user device, the user may speak an utterance. The second microphone at the second device may be used to detect the user utterance and the second device may determine voice data based at least in part on the audio captured using the second microphone. The second device may send the voice data to the user device. The user device may therefore receive the voice data from the second device, although the user interacted with the first device. In some embodiments, the user device may send the second device a fourth indication to deactivate the second microphone after receiving the voice data from the second device. The user device may, in some instances, associate the voice data with a device identifier of the first device, such that any response to the voice data may be presented at the first device. For example, the voice data may include a request for information, and the user device may track that although the voice data was received from the second device, the information is to be presented at the first device because the user initially interacted with the first device.

At block 580 of the process flow 500, computer-executable instructions stored on a memory of a device, such as a user device, may be executed to determine a response to the voice data. For example, one or more communication modules at the user device may be used to determine a response to the voice data. To determine a response to the voice data, the user device may send the voice data to one or more voice processing servers to determine the request associated with the voice data, and determining the digital response using the request. The user device may send the voice data to one or more voice processing servers to determine a meaning of the voice data, and the voice processing servers may respond with one or more commands and/or directives to the user device (e.g., instructions on actions to perform responsive to the voice data, etc.). The user device may receive the commands and/or directives from the voice processing servers, and may cause presentation of a digital response to a request associated with the voice data at the first device.

At optional block 590 of the process flow 200, computer-executable instructions stored on a memory of a device, such as a user device, may be executed to send the response to the first device for presentation. For example, one or more modules at the user device may be executed to send the response to the first device for presentation. The response may be an audible and/or visual response, such as the presentation of certain information (e.g., weather, traffic, etc.), and may be presented at the first device. In some embodiments, the user device may cause presentation of an audible response to the request associated with the voice data using a speaker of the first device, and/or may cause presentation of a visual response to the request associated with the voice data using a display of the first device.

Figure 6:
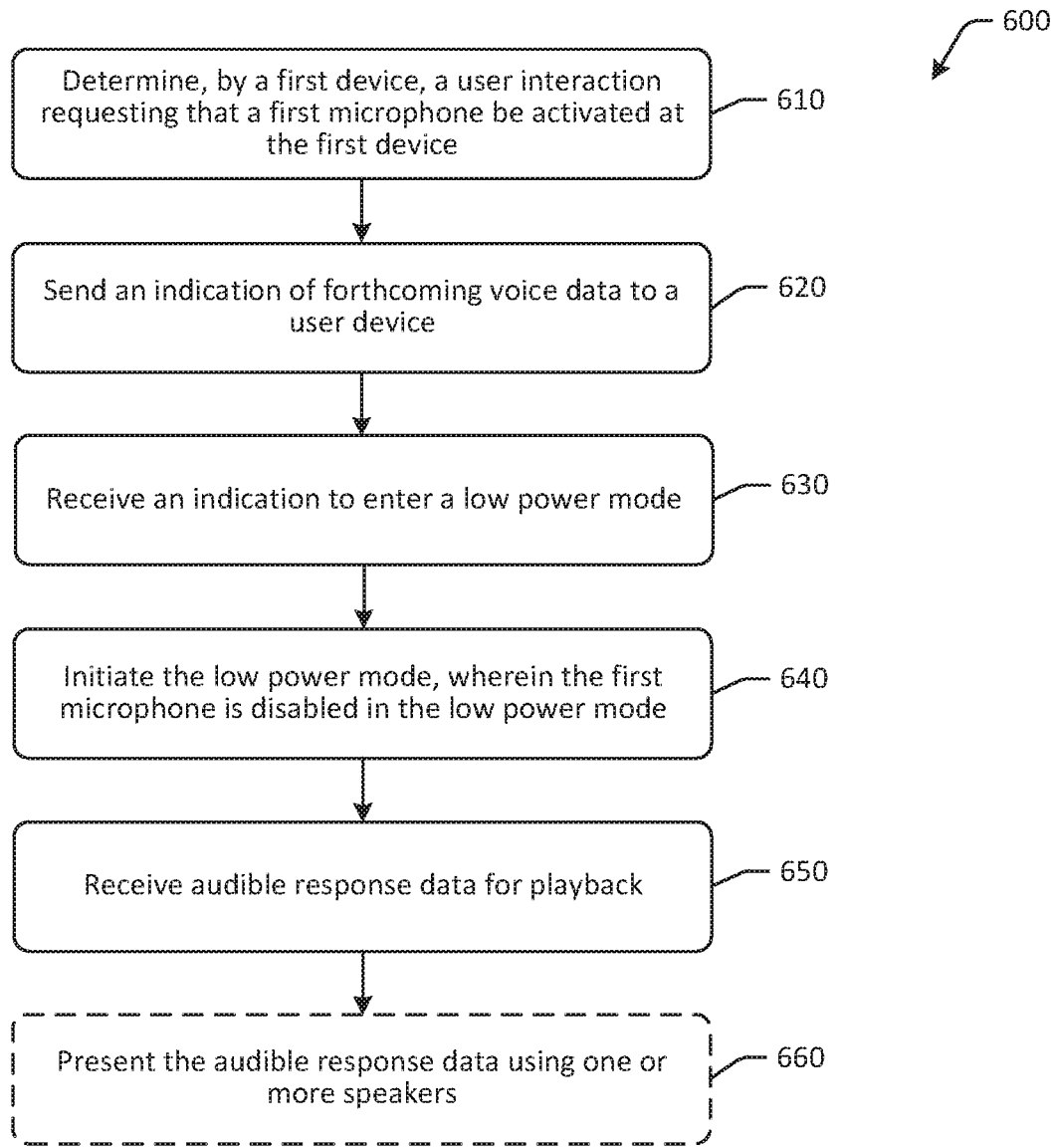
FIG. 6 is a schematic illustration of an example process flow for reducing battery consumption for portable devices with microphones and/or other sensors in accordance with one or more example embodiments of the disclosure.

FIG. 6 is a schematic illustration of an example process flow 600 for reducing battery consumption for portable devices with microphones and/or other sensors in accordance with one or more example embodiments of the disclosure. While example embodiments of the disclosure may be described in the context of ring-shaped electronic devices, it should be appreciated that the disclosure is more broadly applicable to any type of device with limited battery capacity. Some or all of the blocks of the process flows in this disclosure may be performed in a distributed manner across any number of devices. The operations of the process flow 600 may be optional and may be performed in a different order.

At block 610 of the process flow 600, computer-executable instructions stored on a memory of a device, such as a ring-shaped electronic device or other wearable device, may be executed to determine, by a first device, a user interaction requesting that a first microphone be activated at the first device. For example, one or more interaction detection modules at a ring-shaped electronic device or other wearable device may be executed to determine a user interaction requesting that a first microphone be activated at the first device. For example, the first device may detect a certain button press, a certain gesture, or other user interaction that may indicate the user desires to make a speech input or otherwise speak an utterance for which a microphone may be used.

At block 620 of the process flow 600, computer-executable instructions stored on a memory of a device, such as a ring-shaped electronic device or other wearable device, may be executed to send an indication of forthcoming voice data to a user device. For example, one or more communication modules at a ring-shaped electronic device or other wearable device may be executed to send an indication of forthcoming voice data to a user device. The ring-shaped electronic device may indicate to the user device that a voice data stream is to be initiated.

At block 630 of the process flow 600, computer-executable instructions stored on a memory of a device, such as a ring-shaped electronic device or other wearable device, may be executed to receive an indication to enter a low power mode. For example, one or more communication modules at a ring-shaped electronic device or other wearable device may be executed to receive an indication to enter a low power mode. The indication may be received from the user device.

At block 640 of the process flow 600, computer-executable instructions stored on a memory of a device, such as a ring-shaped electronic device or other wearable device, may be executed to initiate the low power mode, where the first microphone is disabled in the low power mode. For example, one or more modules at a ring-shaped electronic device or other wearable device may be executed to initiate the low power mode, where the first microphone is disabled in the low power mode. As a result, the ring-shaped electronic device may enter the low power mode and may not activate the first microphone.

At block 650 of the process flow 600, computer-executable instructions stored on a memory of a device, such as a ring-shaped electronic device or other wearable device, may be executed to receive audible response data for playback. For example, one or more communication modules at a ring-shaped electronic device or other wearable device may be executed to receive audible response data for playback. The ring-shaped electronic device may receive the audible response data from the user device, and may enter a normal mode or otherwise exit the low power mode. The audible response data may include instructions to present the audible response using one or more speakers of the first device.

At optional block 660 of the process flow 600, computer-executable instructions stored on a memory of a device, such as a ring-shaped electronic device or other wearable device, may be executed to present the audible response data using one or more speakers. For example, one or more modules at a ring-shaped electronic device or other wearable device may be executed to present the audible response data using one or more speakers. The ring-shaped electronic device may present the audible response using one or more speakers of the first device.

As a result, the first device at which the user interacted may be used to present the requested information, while the first microphone at the first device may not be used, thereby preserving battery at the first device due to reduced microphone (or other sensor) data.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
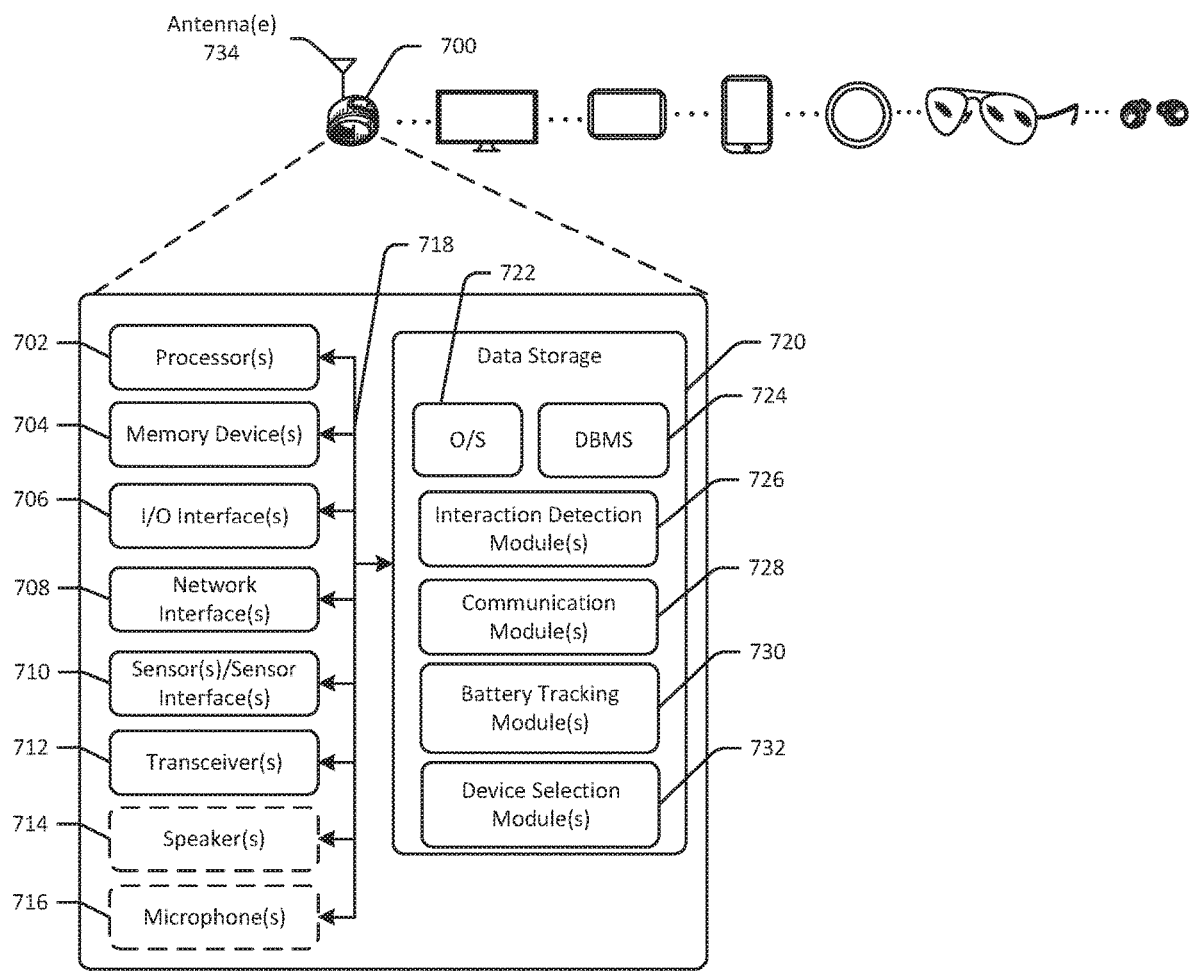
FIG. 7 is a schematic block diagram of an illustrative device in accordance with one or more example embodiments of the disclosure.

FIG. 7 is a schematic block diagram of an illustrative ring-shaped electronic device 700, or another device, such as a user device, a wearable device, or another device type, in accordance with one or more example embodiments of the disclosure. The ring-shaped electronic device 700 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The ring-shaped electronic device 700 may correspond to an illustrative device configuration for the devices of FIGS. 1-6.

The ring-shaped electronic device 700 may be configured to communicate via one or more networks with one or more servers, search engines, user devices, or the like. In some embodiments, a single remote server or single group of remote servers may be configured to perform more than one type of battery saving functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the ring-shaped electronic device 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The ring-shaped electronic device 700 may further include one or more buses 718 that functionally couple various components of the ring-shaped electronic device 700. The ring-shaped electronic device 700 may further include one or more antenna(s) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the ring-shaped electronic device 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the ring-shaped electronic device 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more interaction detection module(s) 726, one or more communication module(s) 728, one or more battery tracking module(s) 730, and/or one or more device selection module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the ring-shaped electronic device 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, user preference information, user action information, user contact data, device pairing information, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the ring-shaped electronic device 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the interaction detection module(s) 726 may include computer-executable instructions, code, or the like that responsive to execution by one or more of the processor(s) 702 may perform functions including, but not limited to, determining button presses, taps, or other button/control interactions, determining button sequence identifiers, determining interaction sequence identifiers, determining contextual data, determining voice commands, determining voice input, determining wakeword utterances, and the like.

The communication module(s) 728 may include computer-executable instructions, code, or the like that responsive to execution by one or more of the processor(s) 702 may perform functions including, but not limited to, communicating with one or more devices, for example, via wired or wireless communication, communicating with user devices, communicating with remote servers, communicating with remote datastores, sending or receiving notifications or commands/directives, communicating with cache memory data, communicating with user devices, and the like.

The battery tracking module(s) 730 may include computer-executable instructions, code, or the like that responsive to execution by one or more of the processor(s) 702 may perform functions including, but not limited to, determining battery status(es), determining battery consumption data, determining battery levels, determining battery draw by a number of sensors, determining whether battery levels are equal to or less than thresholds, and the like.

The device selection module(s) 732 may include computer-executable instructions, code, or the like that responsive to execution by one or more of the processor(s) 702 may perform functions including, but not limited to, determining available or active devices, determining device capabilities, determining devices with microphones, selecting devices to activate microphones, determining whether to activate a sensor or device microphone, and the like.

Referring now to other illustrative components depicted as being stored in the data storage 720, the O/S 722 may be loaded from the data storage 720 into the memory 704 and may provide an interface between other application software executing on the ring-shaped electronic device 700 and hardware resources of the ring-shaped electronic device 700. More specifically, the O/S 722 may include a set of computer-executable instructions for managing hardware resources of the ring-shaped electronic device 700 and for providing common services to other application programs (e.g., managing memory allocation among various application programs). In certain example embodiments, the O/S 722 may control execution of the other program module(s) to for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the ring-shaped electronic device 700 is a mobile device, the DBMS 724 may be any suitable light-weight DBMS optimized for performance on a mobile device.

Referring now to other illustrative components of the ring-shaped electronic device 700, the input/output (I/O) interface(s) 706 may facilitate the receipt of input information by the ring-shaped electronic device 700 from one or more I/O devices as well as the output of information from the ring-shaped electronic device 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the ring-shaped electronic device 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The ring-shaped electronic device 700 may further include one or more network interface(s) 708 via which the ring-shaped electronic device 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(s) 734 may include any suitable type of antenna depending, for example, on the communications protocols used to transmit or receive signals via the antenna(s) 734. Non-limiting examples of suitable antennas may include directional antennas, non-directional antennas, dipole antennas, folded dipole antennas, patch antennas, multiple-input multiple-output (MIMO) antennas, or the like. The antenna(s) 734 may be communicatively coupled to one or more transceivers 712 or radio components to which or from which signals may be transmitted or received.

As previously described, the antenna(s) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 734 may be configured to transmit or receive radio frequency signals within any suitable frequency range forming part of the unlicensed portion of the radio spectrum.

The antenna(s) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 734—transmitting or receiving radio frequency (RF) signals in the bandwidth and/or channels corresponding to the communications protocols utilized by the ring-shaped electronic device 700 to communicate with other devices. The transceiver(s) 712 may include hardware, software, and/or firmware for modulating, transmitting, or receiving—potentially in cooperation with any of antenna(s) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the ring-shaped electronic device 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data, and may include noise cancellation functionality.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the ring-shaped electronic device 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the ring-shaped electronic device 700 may include alternate and/or additional hardware, software, or firmware components beyond those described or depicted without departing from the scope of the disclosure. More particularly, it should be appreciated that software, firmware, or hardware components depicted as forming part of the ring-shaped electronic device 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by a user device comprising one or more computer processors coupled to memory, a first signal from a first wearable device to initiate a first voice data stream from the first wearable device to the user device, wherein the first wearable device comprises a first microphone;
determining that a first battery level of the first wearable device is equal to or less than a handover threshold, wherein the handover threshold is used by the user device to determine whether to activate the first microphone;
determining that a second wearable device wirelessly coupled to the user device is in an active state, wherein the second wearable device comprises a second microphone;
determining that a second battery level of the second wearable device is equal to or greater than the handover threshold;
sending to the first wearable device a second signal that causes the first wearable device to enter a low power mode, wherein the first microphone is disabled in the low power mode;
sending to the second wearable device a third signal that causes the second wearable device to activate the second microphone;
receiving the first voice data stream from the second wearable device;
determining a meaning of a user utterance in the first voice data stream;
determining an audible response to the user utterance; and
sending the audible response to the first wearable device for presentation via one or more speakers, wherein the first wearable device enters an awake state after receiving the audible response.

2. The method of claim 1, further comprising:
determining that a first heart rate sensor at the first wearable device is in an active state;
determining that the second wearable device comprises a second heart rate sensor in an active state;

sending to the first wearable device a fourth signal that causes the first wearable device to deactivate the first heart rate sensor; and receiving heart rate data from the second wearable device.

3. The method of claim 1, further comprising:

determining that a third battery level of a third battery of a third wearable device that is wirelessly coupled to the user device is equal to or greater than the handover threshold; and determining that a first battery capacity of the second battery is greater than a second battery capacity of the third battery.

4. The method of claim 1, wherein the audible response comprises an error notification, the method further comprising:

determining a fourth signal from the first wearable device to initiate a second voice data stream from the first wearable device to the user device;

sending to the first wearable device a fifth signal that causes the first wearable device to activate the first microphone; and receiving the second voice data stream from the first wearable device.

5. A method comprising:

receiving, by a user device comprising one or more computer processors coupled to memory, a first indication from a first device indicating that voice data is forthcoming, wherein the first device comprises a first battery and a first microphone;

determining that a first battery level of the first battery is less than a threshold;

determining that a second device is in an active state, wherein the second device comprises a second battery and a second microphone;

sending to the second device a second indication to activate the second microphone;

receiving the voice data from the second device;

determining that the voice data is incomplete;

causing presentation of an error indicator at the first device;

receiving a third indication from the first device indicating that voice data is forthcoming;

sending to the first device a fourth indication to activate the first microphone;

receiving the voice data from the first device;

sending the first device a fifth indication to deactivate the first microphone; and causing presentation of a digital response to a request associated with the voice data at the first device.

6. The method of claim 5, wherein the first device further comprises a first sensor of a first type, and the second device further comprises a second sensor of the first type, the method further comprising:

determining that the second sensor is active;

sending to the first device a third indication to deactivate the first sensor;

receiving sensor data from the second device using the second sensor; and sending the sensor data to the first device.

7. The method of claim 5, further comprising:

associating the voice data with a device identifier of the first device.

8. The method of claim 5, further comprising:

sending to the first device a third indication to initiate a low power mode prior to sending the second device the second indication to activate the second microphone; and sending to the second device a fourth indication to deactivate the second microphone after receiving the voice data from the second device.

9. The method of claim 5, further comprising:

determining that a second battery level of the second battery is greater than or equal to the threshold.

10. The method of claim 5, wherein the first device, the second device, and a third device are wirelessly coupled to the user device, the method further comprising:

determining that a second battery level of the second battery is less than or equal to the threshold;

determining that a third battery level of a third battery of the third device is less than or equal to the threshold; and determining that a first battery capacity of the second battery is greater than a second battery capacity of the first battery, and a third battery capacity of the third battery.

11. The method of claim 5, wherein the first device, the second device, and a third device are wirelessly coupled to the user device, the method further comprising:

determining that a second battery level of the second battery is less than or equal to the threshold;

determining that a third battery level of a third battery of the third device is less than or equal to the threshold; and determining that a first battery draw associated with microphone usage of the second device is less than a second battery draw associated with microphone usage of the first device, and a third battery draw associated with microphone usage of the third device.

12. The method of claim 5, further comprising:

sending the voice data to a voice processing server to determine the request associated with the voice data; and determining the digital response using the request.

13. The method of claim 5, wherein causing presentation of the digital response to the request associated with the voice data at the first device comprises:

causing presentation of an audible response to the request associated with the voice data using a speaker of the first device;

causing presentation of a visual response to the request associated with the voice data using a display of the first device; or causing presentation of a vibrational response to the request associated with the voice data using a vibrational motor of the first device.

14. The method of claim 5, wherein the first microphone is disabled after the first indication is received from the first device, and wherein the first device comprises a button that is pressed to trigger the first indication.

15. A user device comprising:

memory configured to store computer-executable instructions; and at least one computer processor configured to access the memory and execute the computer-executable instructions to:

receive a first indication from a first device indicating that voice data is forthcoming, wherein the first device comprises a first battery and a first microphone;

determine that a first battery level of the first battery is less than a threshold;

determine that a second device is in an active state, wherein the second device comprises a second battery and a second microphone;

send to the second device a second indication to activate the second microphone;

receive the voice data from the second device;

determine that the voice data is incomplete;

cause presentation of an error indicator at the first device;

receive a third indication from the first device indicating that voice data is forthcoming;

send to the first device a fourth indication to activate the first microphone;

receive the voice data from the first device; and cause presentation of a digital response to a request associated with the voice data at the first device.

16. The user device of claim 15, wherein the first device further comprises a first sensor of a first type, and the second device further comprises a second sensor of the first type, and wherein the at least one processor is further configured to access the memory and execute the computer-executable instructions to:

determine that the second sensor is active;

send to the first device a third indication to deactivate the first sensor;

receive sensor data from the second device using the second sensor; and send the sensor data to the first device.

17. The user device of claim 15, wherein the at least one processor is further configured to access the memory and execute the computer-executable instructions to:

send to the first device a third indication to initiate a low power mode prior to sending the second device the second indication to activate the second microphone; and send to the second device a fourth indication to deactivate the second microphone after receiving the voice data from the second device.

18. The user device of claim 15, wherein the at least one processor is further configured to access the memory and execute the computer-executable instructions to:

determine that a second battery level of the second battery is greater than or equal to the threshold.

* * * * *